United States Patent
Berzinis

(12) 
(10) Patent No.: US 6,476,128 B1
(45) Date of Patent: Nov. 5, 2002

(54) LOW-GLOSS BLENDS CONTAINING POLY (METH)ACRYLATE RUBBER-BASED GRAFT COPOLYMER AND PROCESS FOR MAKING THEREOF

(75) Inventor: Albin P. Berzinis, Marietta, OH (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/822,667

(22) Filed: Mar. 30, 2001

(51) Int. Cl.[7] .......................... C08L 51/04; C08L 33/06; C08F 259/04
(52) U.S. Cl. ............................. 525/70; 525/76; 525/80; 525/222; 525/317
(58) Field of Search .............................. 525/70, 80, 76, 525/222, 317

(56) References Cited

U.S. PATENT DOCUMENTS 5,441,816 A * 8/1995 Grohman .................... 428/520

* cited by examiner

*Primary Examiner*—James J. Seidleck
*Assistant Examiner*—Olga Asinovsky

(57) ABSTRACT

A process for controlling the surface gloss of a molded composition of: (a) a polyvinyl chloride resin and (b) a graft copolymer comprising a discontinuous poly(alkyl(meth)acrylate) rubber phase and a rigid thermoplastic phase, wherein at least a portion of rigid thermoplastic phase is chemically grafted to the poly(alkyl(meth)acrylate) rubber phase, by regulating the cross-link density and thus the swell index of the rubber phase in the graft copolymer to at least about 8 to vary the surface gloss after extrusion.

11 Claims, 2 Drawing Sheets

LOW-GLOSS BLENDS CONTAINING POLY (METH)ACRYLATE RUBBER-BASED GRAFT COPOLYMER AND PROCESS FOR MAKING THEREOF

FIELD OF THE INVENTION

The present invention relates to a process for controlling the siding gloss in thermoplastic compositions comprising a blend of PVC resin and ASA graft copolymers.

BACKGROUND

Graft copolymers comprising a discountinous poly(alkyl (meth)acrylate rubber phase and a rigid thermoplastic phase, e.g., ASA graft copolymers, may be used in extrusion compositions for their desirable properties as impact modifiers. U.S. Pat. No. 6,054,531 discloses a method for controlling the swell index and gel content of an emulsion polymerized cross-linked polyacrylate rubber to improve its performance as an impact modifier in a thermoplastic material. EP Publication No. 913408 discloses a process for making a polyacrylate rubber in the presence of a surfactant having the formula R—SO$_3$M wherein R is an alkyl, and M is a hydrogen radical or a cation. Such a rubber is found to provide improved weatherability when used as an impact modifier in thermoplastic resin extrusion compositions.

Thermoplastic compositions comprising graft copolymers are often used in weatherable applications such as outdoor furniture or housing sidings. It is often desirable to control the gloss of the surface of such articles to improve aesthetics, e.g., for the sidings to have more of a wood-like appearance. One practice is to add abrasive fillers such as aluminum silicate or calcium carbonate to the thermoplastic compositions to give a matte surface. U.S. Pat. No. 4,945,131 teaches the regulation of the swell index of high impact polystyrene rubber phase to control the surface gloss of a blend of polyphenylene ether resin after molding. Going the reverse direction with respect to the effect of cross-linking on surface gloss, U.S. Pat. No. 5,130,374 discloses thermoplastic compositions with reduced gloss by the use of cross-linked PVC as an additive to conventional PVC siding and that a higher level of cross-linking will lead to lower gloss levels. U.S. Pat. No. 4,894,416 teaches the use of epoxide-containing resins to form additional cross-links as a means for reducing gloss levels in ASA resins.

Applicants have found that the gloss in blends comprising PVC and ASA graft copolymers can be controlled by the swell index in the polyacrylate rubber, preferably lowering the cross-linking index to within a controlled range.

SUMMARY OF THE INVENTION

The present invention relates to a method to control the surface gloss of a composition of: (a) a polyvinyl chloride resin and (b) a graft copolymer comprising a discontinuous poly(alkyl(meth)acrylate) rubber phase and a rigid thermoplastic phase, wherein at least a portion of rigid thermoplastic phase is chemically grafted to the poly(alkyl(meth) acrylate) rubber phase, by regulating the swell index of the rubber phase in the graft copolymer to at least about 8 to vary the surface gloss after extrusion or molding.

In one embodiment of the present invention, the swell index is regulated by controlling the amount of the polyethyleneically unsaturated monomer to about 0.10 to 0.40 parts by weight of the polyethyleneically unsaturated monomer per 100 parts by weight of the alkyl(meth)acrylate monomer in the emulsion polymerization reaction to prepare the poly(alkyl(meth)acrylate) rubber phase.

In a second embodiment of the present invention, the polyethyleneically unsaturated monomer which functions as the cross-linking and graft-linking monomer in the preparation of the poly(alkyl(meth)acrylate) rubber latex comprises triallyl cyanurate.

DETAILED DESCRIPTION OF THE INVENTION

Figure 1:
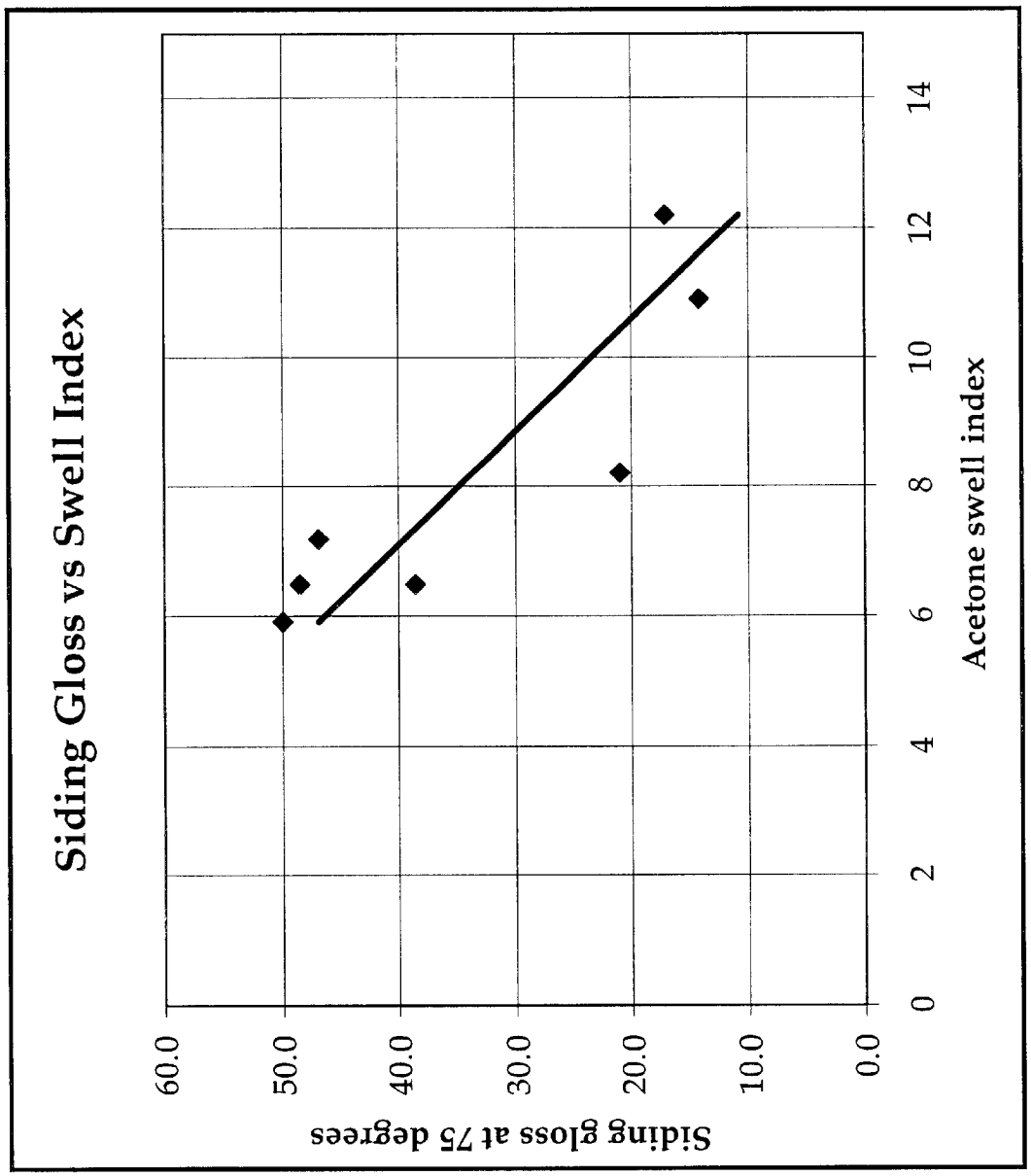
FIG. 1 shows a plot of siding gloss versus swell index of the graft copolymer in the process of the present invention.

The present invention involves, in one of its aspects, a thermoplastic composition comprising a polyvinyl chloride (PVC) and a graft copolymer.

A. PVC for the Composition

The first component of the low-gloss extrusion composition of the present invention is polyvinyl chloride or PVC. PVC polymer as used in this invention means polyvinyl chloride homopolymers, or vinyl chloride polymerized with up to 50% by weight of one or more other monomer(s), or a cross-linked polyvinyl chloride polymer, or mixtures thereof. The PVC polymer of this invention may be produced by any of the known polymerization processes such as mass, suspension, solution or emulsion.

In one embodiment of the present invention, the polyvinyl chloride polymer is a polyvinyl chloride homopolymer.

In another embodiment of the invention, PVC copolymers are used. Comonomers that may be used to give a PVC copolymer includes esters of acrylic acid, for example, methyl acrylate, ethyl acrylate, butyl acrylate, octyl acrylate, cyanoethyl acrylate, and the like; vinyl acetate; esters of methacrylic acid, such as methyl methacrylate, ethyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other olefinic monomers copolymerizable therewith; and other monomers known to those skilled in the art which will give rigid copolymers with vinyl chloride. The amount of comonomer that can be polymerized with vinyl chloride to give a rigid copolymer is a function of the choice of comonomer, as is well understood by those skilled in the art.

In other embodiments wherein some of the PVC polymers used are cross-linked, the cross-linked PVC can be chemically cross-linked, or it can be cross-linked by radiation, UV light, heat, or post polymerization cross-linked using peroxides. The term cross-linked PVC as used in this specification is intended to include all types of cross-inked PVC, regardless of how the cross-linking is achieved.

The amount of PVC resin in the composition of the present invention is from 30 part by weight to about 70 parts by weight B. Graft Copolymer Component The second component of the low-gloss composition is a graft copolymer, comprising a discontinuous poly(alkyl (meth)acrylate rubber phase and a rigid thermoplastic phase, at least a portion of the which is chemically grafted to the poly(alkyl(meth)acrylate) rubber phase.

Process for Preparing poly(alkyl(meth)acrylate rubber latex/substrate

The poly(alkyl(meth)acrylate rubber substrate for use in making the graft copolymer in the composition is made in an emulsion polymerization process. In a typical process, feed streams of reactants and reaction media, including water, a monoethylenically unsaturated alkyl(meth)acrylate monomer, a polyethylenically unsaturated monomer, optionally a surfactant, and a polymerization initiator are continuously fed to a reactor that is maintained under emulsion polymerization conditions. The reactor may be heated under an inert atmosphere with stirring. In one embodiment, the reaction mixture is heated to and maintained at a reaction temperature from 100° F. to 180° F.

The product stream, in the form of an aqueous poly(alkyl (meth)acrylate) rubber latex with an emulsion of poly(alkyl (meth)acrylate) rubber particles, continuously flows from the reactor for use in preparing the graft copolymer in the step in the process.

In one embodiment, the monoethylenically unsaturated alkyl(meth)acrylate monomer is selected from $(C_1-C_{12})$ alkyl(meth)acrylate monomers and mixtures thereof, more preferably from $(C_1-C_{12})$alkyl acrylate monomers and mixtures thereof. As used herein, the terminology "monoethylenically unsaturated" means having a single site of ethylenic unsaturation per molecule and the terminology "(meth) acrylate monomers" refers collectively to acrylate monomers and methacrylate monomers and the terminology "$(C_x-C_y)$", as applied to a particular unit, such as, for example, a chemical compound or a chemical substituent group, means having a carbon atom content of from x carbon atoms to y carbon atoms per such unit, for example, "$(C_1-C_{12})$alkyl" means a straight or branched alkyl substituent group having from 1 to 12 carbon atoms per group and includes, e.g., methyl, ethyl, n-butyl, sec-butyl, t-butyl, n-propyl, iso-propyl, pentyl, hexyl, heptyl, octyl, nonyl, decyl, undecyl and dodecyl. Suitable $(C_1-C_{12})$alkyl(meth) acrylate monomers include $(C_1-C_{12})$alkyl acrylate monomers, e.g., ethyl acrylate, butyl acrylate, iso-pentyl acrylate, n-hexyl acrylate, 2-ethyl hexyl acrylate, and their $(C_1-C_{12})$alkyl methacrylate analogs such as, e.g., methyl methacrylate, ethyl methacrylate, propyl methacrylate, iso-propyl methacrylate, butyl methacrylate, hexyl methacrylate, decyl methacrylate. In another embodiment, the alkyl(meth)acrylate monomer used in the process of the present invention is butyl acrylate monomer.

As used herein, the terminology "polyethylenically unsaturated" means having two or more sites of ethylenic unsaturation per molecule. A polyethylenically unsaturated monomer is used in the process of the present invention to provide cross-linking of the poly(alkyl(meth)acrylate) rubber particles formed in the process and to provide "graftlinking" sites in the poly(alkyl(meth)acrylate) rubber for subsequent reaction with grafting monomers.

In one embodiment, graftlinking monomers include those monomers having at least one site of ethylenic unsaturation that have a reactivity that is similar, under the emulsion polymerization, to that of the alkyl(meth)acrylate monomer and at least one other site of ethylenic unsaturation having a reactivity that is substantially different from that of the monoethylenically unsaturated alkyl(meth)acrylate monomer, so that at least one unsaturated site per molecule of graftlinking monomer reacts during synthesis of the rubber latex and at least one other unsaturated site per molecule of graftlinking monomer remains unreacted following synthesis of the rubber latex and thus remains available for subsequent reaction under different reaction conditions. Suitable polyethylenically unsaturated monomers include, for example, butylene diacrylate, divinyl benzene, butene diol dimethacrylate, trimethylolpropane tri (meth)acrylate, allyl methacrylate, diallyl maleate, triallyl cyanurate ("TAC"), triallyl isocyanurate and mixtures thereof.

In one embodiment, the polyethylenically unsaturated monomer is present in amount of about 0.10 to 0.40 parts by weight ("pbw") per 100 pbw of monoethylenically unsaturated alkyl(meth)acrylate monomer.

In one embodiment of the present invention, the polyethylenically unsaturated monomer is triallyl cyanurate, for used as both a cross-linking monomer and a graftlinking monomer.

The poly(alkyl(meth)acrylate) rubber of the present invention has a glass transition temperature ($T_g$) of less than or equal to 25° C. The $T_g$ is as measured by differential scanning calorimetry (heating rate 20° C./minute, with the $T_g$ value being determined at the inflection point). The rubber particles for use in making the graft copolymer of the present invention have a weight average particle size of 50 to 800 nm as measured by light transmission. In one embodiment, the index of cross-link density of the rubber as measured by the swollen gel pulse NMR method is in the range of about 20 to 50.

Minor amounts, such as, for example, up to about 25 pbw per 100 pbw of the total amount monomers, of other unsaturated monomers that are copolymerizable with the alkyl(meth)acrylate monomer, may optionally be included in the reaction mixture. Suitable copolymerizable monomers include, for example, monoethylenically unsaturated carboxylic acids such as acrylic acid, methacrylic acid, itaconic acid, glycidyl(meth)acrylate, etc.; hydroxy($C_1-C_{12}$)alkyl (meth)acrylate monomers such as hydroxyethyl methacrylate; $(C_4-C_{12})$cycloalkyl(meth)acrylate monomers such as cyclohexyl methacrylate; (meth)acrylamide monomers such as acrylamide and methacrylamide; maleimide monomers such as N-alkyl maleimides, N-aryl maleimides, maleic anhydride; vinyl esters such as vinyl acetate and vinyl propionate. Also suitable are vinyl aromatic monomers such as for example, styrene and substituted styrenes having one or more alkyl; alkoxyl, hydroxyl or halo substituent group attached to the aromatic ring, including, e.g., α-methyl styrene, p-methyl styrene, vinyl toluene, vinyl xylene, trimethyl styrene, butyl styrene, chlorostyrene, dichorostyrene, bromostyrene, p-hydroxystyrene, methoxystyrene; and vinyl-substituted condensed aromatic ring structures, such as, e.g., vinyl naphthalene, vinyl anthracene, as well as mixtures of vinyl aromatic monomers; monoethylenically unsaturated nitrile monomers such as for example, acrylonitrile, methacrylonitrile, α-chloro acrylonitrile.

Optional surfactants for use include one or more compounds according to formula R—$SO_4M$, wherein R is alkyl or alkoxyl and M is a hydrogen radical or a cation. Examples include sodium lauryl sulfate ("SLS"), sodium decyl sulfate, sodium 2-ethylhexyl sulfate, potassium lauryl sulfate, ammonium lauryl sulfate, diethanol ammonium lauryl sulfate, and tetraethanol ammonium lauryl sulfate. Other optional surfactants for use include one or more compounds according to formula R—$SO_3M$, wherein R is alkyl or alkoxyl and M is a hydrogen radical or a cation. Examples include sodium eicosyl sulfonate and sodium paraffin sulfonate. Optional surfactants may be present in amount of about 1 to 4 pbw of the surfactant per 100 pbw of the monoethylenically unsaturated alkyl(meth)acrylate monomer.

In one embodiment, one or more initiators may be used in an amount of about 0.01 to 2 pbw. They are selected from a conventional free radical initiators such as an organic peroxide compound, for example, benzoyl peroxide; a persulfate compound such as potassium persulfate; an azonitrile compound such as 2,2'-azobis-2,3,3-trimethylbutyronitrile;or a redox initiator system, such as a combination of a peroxide or hydroperoxide, such as for example, hydrogen peroxide, cumene hydroperoxide ("CHP") or t-butyl hydroperoxide; an oxidizing agent such as ferrous sulfate; a chelating agent such as, for example, tetrasodium pyrophosphate ("TSPP"), ethylene diamine tetraacetic acid ("EDTA") or a salt of ethylene diamine tetraacetic acid, and a reducing agent, such as, for example, sodium formaldehyde sulfoxylate or a reducing sugar.

In one embodiment, about 0.01 to 1.0 pbw of an electrolyte per 100 pbw alkyl(meth)acrylate monomer is also used. Suitable electrolytes include, for example, tetrasodium pyrophosphate and sodium sulfate.

Process for Preparing the Graft Copolymer

In the second phase for making the graft copolymer, monomers are polymerized in the presence of poly(alkyl (meth)acrylate)rubber particles made in the first phase to thereby form a graft copolymer having a dispersed poly (alkyl(meth)acrylate) rubber phase and a rigid thermoplastic phase, at least a portion of which is chemically grafted to the poly(alkyl(meth)acrylate) rubber phase.

In one embodiment, the rigid thermoplastic resin phase comprises thermoplastic polymer or copolymer that exhibits a $T_g$ of greater than 25° C. In another embodiment, the rigid thermoplastic phase comprises a polymer having repeating units derived from one or more monomers selected from the group consisting of ($C_1$–$C_{12}$)alkyl(meth)acrylate monomers, vinyl aromatic monomers and monoethylenically unsaturated nitrile monomers. Suitable ($C_1$–$C_{12}$)alkyl(meth) acrylate monomers, vinyl aromatic monomers and monoethylenically unsaturated nitrile monomers are those set forth above in the description of the rubber phase. In one embodiment, the rigid thermoplastic resin phase comprises a vinyl aromatic polymer having first repeating units derived from one or more vinyl aromatic monomers and having second repeating units derived from one or more monoethylenically unsaturated nitrile monomers.

The rigid thermoplastic phase is made according to known processes, e.g., mass polymerization, emulsion polymerization, suspension polymerization or combinations thereof, wherein a at least a portion of the rigid thermoplastic phase is chemically bonded, i.e., "grafted" to the rubber phase via reaction with unsaturated sites present in the rubber phase. The unsaturated sites in the rubber phase are provided, e.g., by residual unsaturated sites in those repeating units of the rubber that were derived from a graftlinking monomer.

The amount of grafting that takes place between the rigid thermoplastic phase and the rubber phase varies with the relative amount and composition of the rubber phase. In one embodiment, about 10 to 90 wt % of the rigid thermoplastic phase is chemically grafted to the rubber. In a second embodiment, about 40 to 90 wt % of the rigid thermoplastic phase remains "free," that is, non-grafted.

The amount of graft copolymer in the composition of the present invention is from 30 to about 70 parts by weight. In one embodiment of the invention, the graft copolymer is acrylate-styrene-acrylonitrile (ASA).

Optional Components

The blends of the invention may be further modified by addition of other types of additives known to the art of plastics compounding, including fillers (clay, talc, etc.), reinforcing agents (glass fibers), impact modifiers, plasticizers, flow promoters and other processing aids, stabilizers, colorants, mold release agents, flame retardants, UV screening agents, and the like.

Preparation of the Composition

The production of the composition of the invention is done by any of the operations known for the blending and extrusion of compositions containing PVC, such as blending in a two-roll mill, a Banbury mixer, a single screw extruder or twin-screw extruder.

The composition of the present invention can be formed into useful articles by a variety of known processes such as, for example, profile extrusion, sheet extrusion, extrusion blow molding and thermoforming, and injection molding.

The composition of the present invention is particularly well suited as construction materials such as vinyl siding applications and articles such as, e.g., fencing, decking planks, outdoor furniture, etc.

EXAMPLES

The process of the invention is illustrated by the following examples, which are not, however, to be construed as limiting in anyway.

In all examples, the composition is a blend of acrylate-styrene-acrylonitrile (ASA) and polyvinyl vinyl chloride resin with a K value of about 67.

In examples 1–10, the ASA is prepared as follows for a broad size distribution of cross-linked butylacrylate rubber. The amounts of butyl acrylates and the cross-linking agent (s) vary depending on the examples. Example 11 employs an ASA graft copolymer commercially produced under the trade name GELOY GY 1030G ASA from General Electric Company and prepared according to U.S. Pat. No. 3,944,631 with the use of divinyl benzene ("DVB") as an additional cross-linking monomer, at a cross-link level of about 0.1 pbw of ASA.

In examples 1–10, the following monomer mixture is fed to a stirred reaction vessel at 140° F. at a rate of 1 reactor volume every 90 minutes. butyl acrylate, with "pbw" indicates part per hundred based on the weight of butyl acrylate:

a) butyl acrylate
b) TAC (triallylcyanurate)
c) 0.12 pbw CHP
d) 0.15 TSPP
e) 0.05 FE
f) 0.25 EDTA Na2
g) 0.132 SFS
h) 250 demineralized water In the next step, latex containing 32 parts of the acrylic rubber as prepared above is charged along with 190 parts of demineralized water to a semi-batch emulsion polymerization reactor and heated to 140° F. The acrylic rubber substrate is then reacted with the following monomers and additives (in pbw relative to 32 pbw of acrylic rubber, for a total of 100 parts) over 120 minutes feed time:

i) 50.5 Styrene
j) 17.5 Acrylonitrile
k) 0.275 CHP
l) 0.165 EDTA-Na2
m) 0.0033 FeSO4
n) 0–0.1 tert-dodecyl mercaptam (t-DDM) depending on the example
o) 0–0.1 DVB depending on the example The resulting ASA graft copolymer is isolated via coagulation with CaCl2 and dried in a fluidized bed dryer. The ASA graft copolymer powder is then mixed with the PVC and other additives according to the formula:

a) 50 parts PVC resin (K=69)
b) 1.8 parts tin stabilizer
c) 50 parts ASA resin (examples 1–10)
d) 1 part acrylic process aid
e) 0.2 parts oxidized polyethylene wax
f) 5 parts TiO2.

The blend is mixed in a high speed Henschel mixer, then co-extruded on a laboratory twin-screw siding extrusion line through a conventional dual-manifold siding die, then onto a conventional side substrate formulation for vinyl sidings. Color concentrates typical for vinyl sidings are introduced to the ASA/PVC blend for the desired colors. The extrudate is passed through a conventional vinyl siding embossing roller and forming table. The feed ratios of ASA/PVC capstock formulation and substrate formulation are adjusted to maintain an ASA/PVC capstock thickness of 0.004–0.008" and a substrate thickness of about 0.035".

Weight percent solids are determined utilizing a CEM Labwave 9000 gravimetric microwave drier, drying to a constant weight at 50% full microwave output.

Gel content is determined by diluting about 0.5 g of a specified rubber substrate or graft sample into a known amount of acetone (about 30 g) with shaking at ambient temperature for 24 hours, and then centrifuging the dilute dispersion for 1.5 hours at 15,000 rpm in a Sorvall Superspeed RC2-B Automatic Refrigerated Centrifuge. The supernatant is removed and evaporated to dryness, allowing gravimetric determination of the soluble portion to determine gel content. The substrate swollen gel weight is determined gravimetrically, then the solvent contained is carefully removed and the weight of dry insoluble gel determined gravimetrically. The weight of swollen gel is divided by the weight of dried insoluble gel to yield the swell index.

The index of cross-link density of the acrylic rubber is measured by the pulse NMR spectroscopy using a Bruker Minispec PC120. The cross-linking index is the percentage of the NMR free induction decay signal which remains after 5 milliseconds delay following an initial excitation of a 90 degree pulse. The ungrafted rubber substrates are measured as a swollen gel in a solution of tetrachloroethylene; the grafted ASA resin powders are measured directly. The melt flow rate ("MFR") is measured according to ASTM D1238 under conditions of 220 degrees C. and an applied mass of 10 Kg.

In the examples, emulsion polymerized ASA rubbers are characterized with respect to: a) the amount of cross-linking agents present as part per hundred based on the weight of butyl acrylate, styrene and acrylonitrile monomer charges (ASA); b) cross-link index by pulse NMR; c) gel content (as % insoluble); d) swell index in acetone; e) MFR; and f) siding gloss.

| Example | pbw TAC | pbw tDDM | pbw DVB | NMR Crosslink index | Acetone Swell Index | Acetone % Insol | MFR | Siding Gloss |
|---|---|---|---|---|---|---|---|---|
| 1 | 0.15 | 0.0 | 0.0 | 62.5 | 12.2 | 50.7 | 2.4 | 17.0 |
| 2 | 0.15 | 0.0 | 0.0 | 61.8 |  | 50.5 | 1.9 | 15.8 |
| 3 | 0.15 | 0.0 | 0.1 | 63.6 | 8.2 | 61.1 | 0.3 | 20.9 |
| 4 | 0.47 | 0.0 | 0.0 | 70.1 | 7.2 | 58.1 | 1.8 | 46.8 |
| 5 | 0.47 | 0.0 | 0.0 | 70.4 |  | 54.0 | 1.1 | 42.3 |
| 6 | 0.47 | 0.0 | 0.1 | 71.6 | 6.5 | 61.9 | 0.8 | 48.5 |
| 7 | 0.15 | 0.1 | 0.0 | 58.2 | 10.9 | 41.6 | 14.7 | 14.2 |
| 8 | 0.15 | 0.1 | 0.1 | 64.1 |  | 56.4 | 3.0 | 18.3 |
| 9 | 0.47 | 0.1 | 0.0 | 67.9 | 6.5 | 42.7 | 8.3 | 38.5 |
| 10 | 0.47 | 0.1 | 0.1 | 70.5 | 5.9 | 55.6 | 2.5 | 49.9 |
| 11 | GY1030 |  |  | 52.8 |  | 65.0 | 4.6 | 30.3 |

Figure 2:
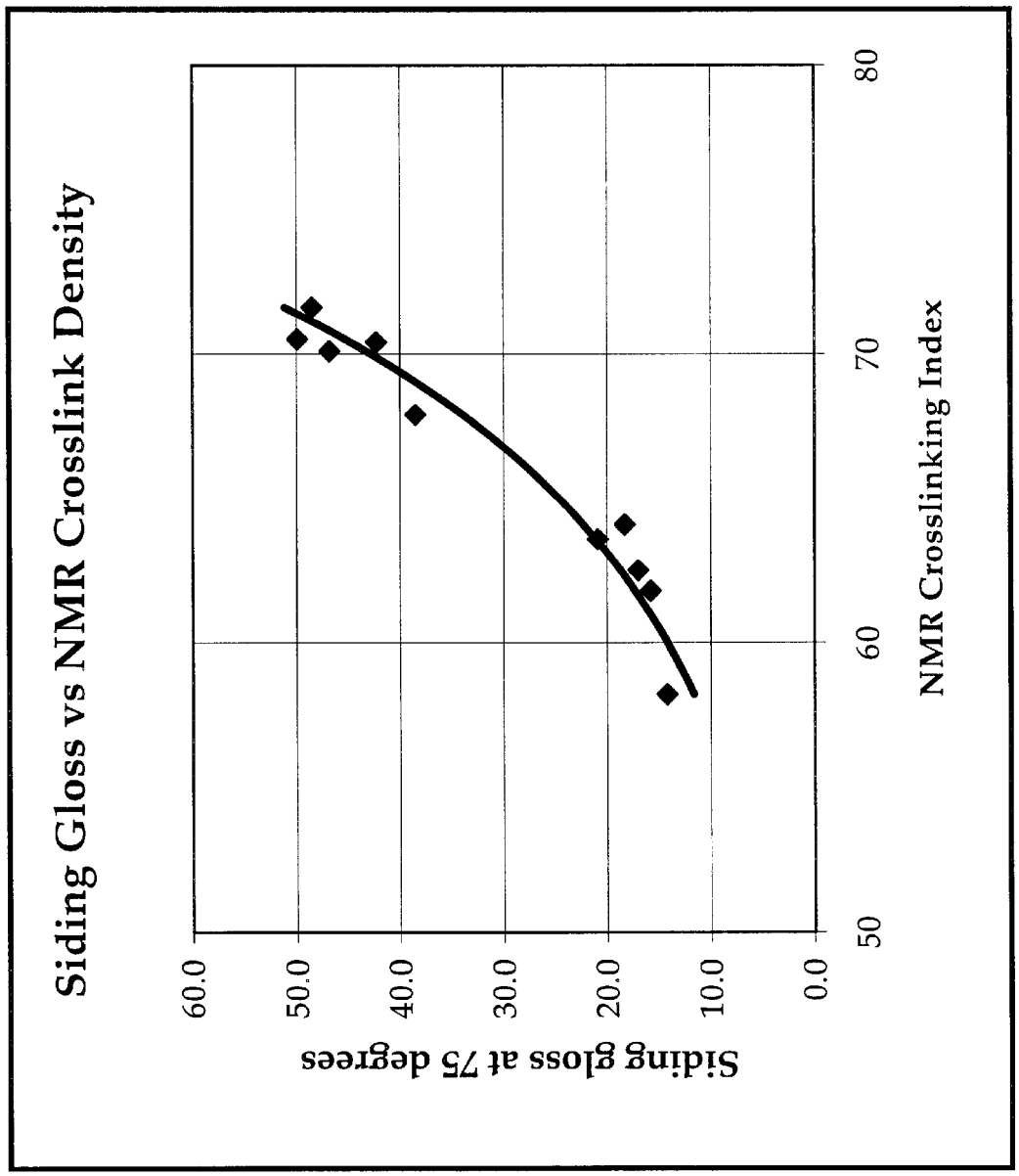
FIG. 2 shows a plot of siding gloss versus the NMR cross-link density of the graft copolymer in the process of the present invention.

FIGS. 1 and 2 are plots of the cross-link index and swell index as a function of the siding gloss. It is noted that if the swell-index goes above 20, it may have an adverse effect on impact strength.

What is claimed is:

1. A method of controlling the surface gloss of an extrudable composition of: (a) 30–70 parts by weight of a polyvinyl chloride polymer and (b) a graft copolymer comprising a discontinuous poly(alkyl(meth)acrylate) rubber phase having a weight average particle size of 50 to 800 nanometers and a rigid thermoplastic phase wherein at least about 10 weight % to about 90 weight % of rigid thermoplastic phase is chemically grafted to the poly(alkyl(meth)acrylate) rubber phase, the graft copolymer having a glass transition temperature of 25° C. or less, said method comprises the steps of (1) extruding the composition, and (2) regulating the swell index of the rubber phase in component (b) to at least about 8 to about 20 by controlling the amount of a polyethylenically unsaturated monomer in an amount of about 0.10 to 0.40 parts by weight per 100 parts by weight of alkyl(meth)acrylate monomer in an emulsion polymerization reaction preparing the poly(alkyl(meth)acrylate) rubber phase in order to vary the surface gloss after extrusion in inverse proportion to the swell index.

2. The method according to claim 1, wherein the graft copolymer (b) is an acrylate-styrene-acrylonitrile resin.

3. The method according to claim 1, wherein the rigid thermoplastic phase in the graft copolymer (b) comprises a polymer having repeating units derived from one or more monomers selected from the group consisting of ($C_1$–$C_{12}$) alkyl(meth)acrylate monomers, vinyl aromatic monomers and monoethylenically unsaturated nitrile monomers.

4. The method according to claim 3, wherein the rigid thermoplastic phase comprises a styrene-acrylonitrile copolymer, a α-methyl styrene-acrylonitrile copolymer or a mixture thereof.

5. The method of claim 1, wherein the graft copolymer (b) is prepared by:
   a. polymerizing in an emulsion polymerization reactor in an aqueous medium, an alkyl(meth)acrylate monomer, a polyethyleneically unsaturated monomer, a polymerization initiator and an optional surfactant, to obtain an aqueous product containing a poly(alkyl(meth) acrylate) rubber latex; and
   b. polymerizing one or more monomers selected from the group consisting of $(C_1-C_{12})$alkyl(meth)acrylate monomers, vinyl aromatic monomers and monoethylenically unsaturated nitrile monomers, with said poly(alkyl(meth)acrylate) rubber latex.

6. The method of claim 5, wherein said alkyl(meth) acrylate monomer is butyl acrylate.

7. The method of claim 5, wherein said polyethyleneically unsaturated monomer comprises triallyl cyanurate.

8. The process of claim 5, wherein the optional surfactant is selected from the group consisting of sodium lauryl sulfate, sodium decyl sulfate, sodium 2-ethylhexyl sulfate, potassium lauryl sulfate, ammonium lauryl sulfate, diethanol ammonium lauryl sulfate, tetraethanol ammonium lauryl sulfate, sodium eicosyl sulfonate and sodium paraffin sulfonate and mixtures thereof.

9. The process of claim 8, wherein the surfactant is sodium lauryl sulfate, sodium paraffin sulfonate or a mixture thereof.

10. The process of claim 5, wherein the initiator comprises a redox initiator system, said redox initiator system comprising cumene hydroperoxide and sodium formaldehyde sulfoxylate.

11. The method according to claim 1, wherein said extrusion composition includes one or more additional ingredients selected from among plasticizers, flame retardant agents, stabilizers, antioxidants mold release agents, coloring agents, processing aids, mineral fillers, and glass reinforcing agents.

* * * * *